Figure 1A:
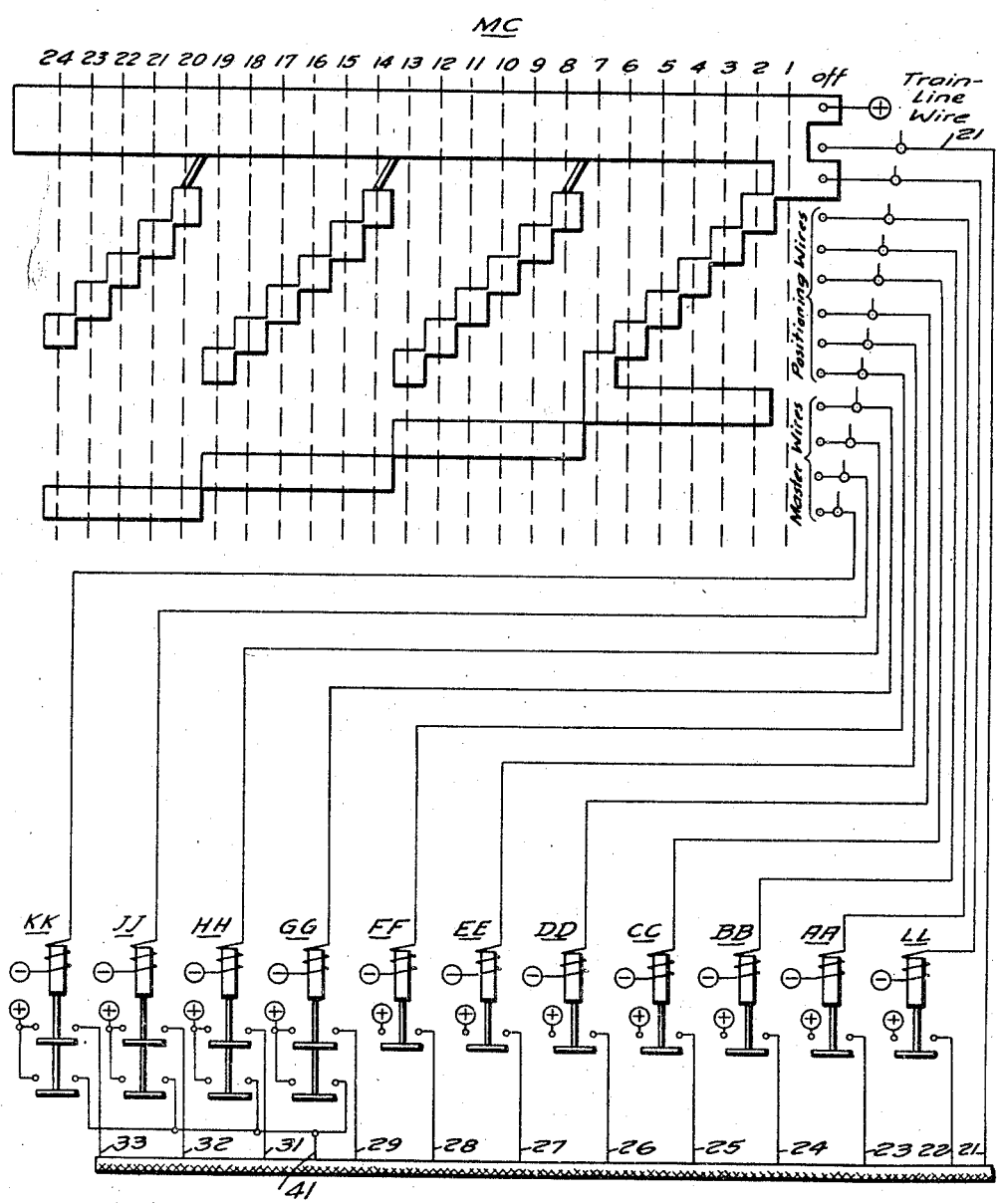

March 16, 1943.  C. E. BASTON  2,313,913
LOCOMOTIVE CONTROL SYSTEM
Filed July 24, 1940   4 Sheets-Sheet 1

WITNESSES:

INVENTOR
Cyril E. Baston.
BY
ATTORNEY

March 16, 1943. C. E. BASTON 2,313,913
LOCOMOTIVE CONTROL SYSTEM
Filed July 24, 1940 4 Sheets-Sheet 2

INVENTOR
Cyril E. Baston.
BY
J.M.Crawford
ATTORNEY

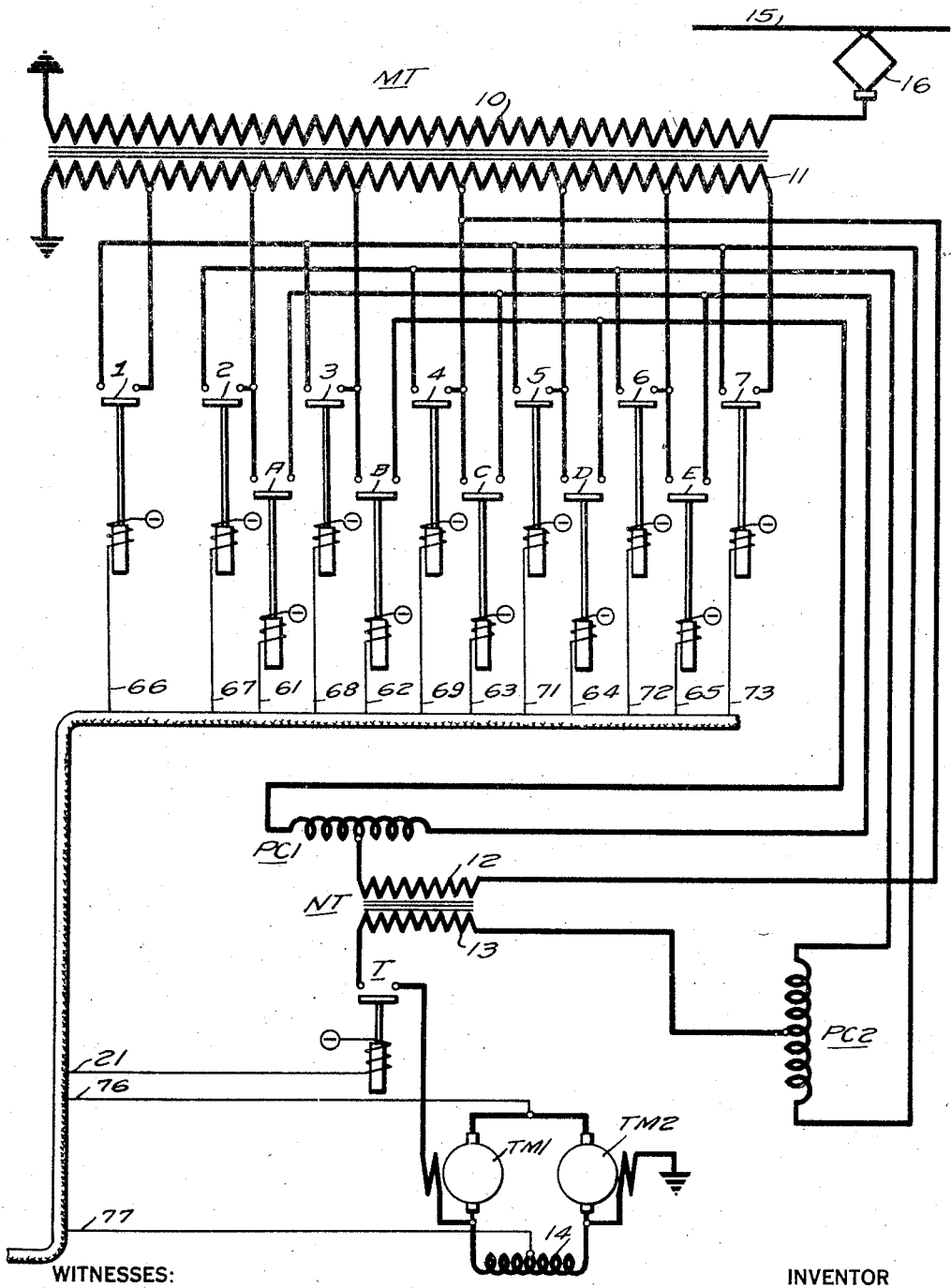

March 16, 1943.　　　C. E. BASTON　　　2,313,913
LOCOMOTIVE CONTROL SYSTEM
Filed July 24, 1940　　　4 Sheets-Sheet 4

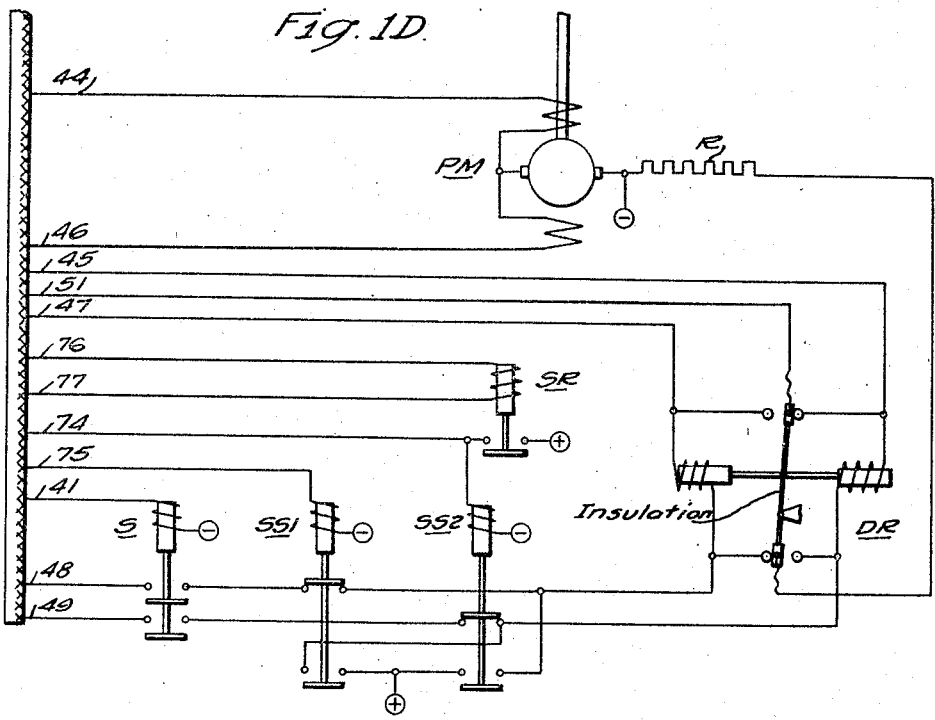

Fig. 1D.

Fig. 2.

| M.C. Notch | Buck Boost Switches | Tap Changing Switches | Sequence Relays |
|---|---|---|---|
| 1 | A & B | 1 & 2 | LL |
| 2 | B & C | 1 & 2 | AA-GG-S |
| 3 | C & D | 1 & 2 | BB-GG-S |
| 4 | D & E | 1 & 2 | CC-GG-S |
| 5 | A & B | 2 & 3 | DD-GG-S |
| 6 | B & C | 2 & 3 | EE-GG-S |
| 7 | C & D | 2 & 3 | FF-GG-S |
| 8 | D & E | 2 & 3 | AA-HH-S |
| 9 | A & B | 3 & 4 | BB-HH-S |
| 10 | B & C | 3 & 4 | CC-HH-S |
| 11 | C & D | 3 & 4 | DD-HH-S |
| 12 | D & E | 3 & 4 | EE-HH-S |
| 13 | A & B | 4 & 5 | FF-HH-S |
| 14 | B & C | 4 & 5 | AA-JJ-S |
| 15 | C & D | 4 & 5 | BB-JJ-S |
| 16 | D & E | 4 & 5 | CC-JJ-S |
| 17 | A & B | 5 & 6 | DD-JJ-S |
| 18 | B & C | 5 & 6 | EE-JJ-S |
| 19 | C & D | 5 & 6 | FF-JJ-S |
| 20 | D & E | 5 & 6 | AA-KK-S |
| 21 | A & B | 6 & 7 | BB-KK-S |
| 22 | B & C | 6 & 7 | CC-KK-S |
| 23 | C & D | 6 & 7 | DD-KK-S |
| 24 | D & E | 6 & 7 | EE-KK-S |

WITNESSES:

INVENTOR
Cyril E. Baston.
BY
ATTORNEY

Patented Mar. 16, 1943

2,313,913

UNITED STATES PATENT OFFICE 2,313,913

LOCOMOTIVE CONTROL SYSTEM

Cyril E. Baston, Forest Hills, Pa., assignor to Westinghouse Electric & Manufacturing Company, East Pittsburgh, Pa., a corporation of Pennsylvania Application July 24, 1940, Serial No. 347,117

5 Claims. (Cl. 172—239)

My invention relates, generally, to control systems and, more particularly, to systems for controlling the operation of electric locomotives.

The control of electric locomotives, particularly alternating current locomotives, frequently involves the problem of causing the movement of a sequence drum or other motor or air operated device to follow exactly a manually operated master controller.

Prior practice has been to utilize a pilot drum driven by the device to be controlled and running connecting wires to the manually operated master controller. When the master controller is moved to a given notch, it energizes a particular wire running to the pilot drum of each device to be controlled. The pilot drum, attached to the device to be controlled has two portions; one portion is so connected to the driving mechanism that when energized it will cause forward movement of the device, and the other portion is so connected that it causes backward movement. In case the device to be controlled is on a lower notch than that of the controller, the energized wire will be connected to the portion of the drum causing forward movement of the device; when the device is on a higher notch, the energized wire is connected to the portion of the drum causing backward movement of the device. The only position of the pilot drum where the energized wire is not connected to either portion is that one corresponding to the position of the master controller.

As will be seen from the foregoing description, a separate wire is required for each notch. In modern locomotives where as many as forty notches are sometimes desired, the number of positioning wires becomes excessive.

An object of my invention is to overcome the foregoing difficulty and to provide a locomotive control system having a relatively large number of notches or steps with a relatively small number of train-line wires.

Another object of my invention is to provide a control system for controlling the movement of one or more driven devices, such as motor operated controllers, in accordance with the movement of a master controller located remotely from the driven devices.

A further object of my invention is to provide for automatically stopping slippage of the driving wheels of an electric locomotive.

A more general object of my invention is to provide a motor control system which shall be simple and efficient in operation and which may be economically manufactured and installed.

Other objects of my invention will be explained fully hereinafter or will be apparent to those skilled in the art.

According to the present invention, a buck-boost system of securing a large number of notches is utilized. The locomotive is controlled by varying the voltage applied to the traction motor circuits by means of a plurality of main tap switches and a buck-boost or notching transformer which is energized by a plurality of auxiliary tap switches. The operation of the various tap-changing switches is controlled by motor driven pilot drums which are in turn controlled by a manually operated master controller. The wires connecting the master controller and the pilot controllers are divided into two groups, one group, called the master wires, determines the section or zone of the controllers to be used, and the other group, called the positioning wires, determines the position in the section selected. Thus, the number of notches obtained is approximately the product of the number of positioning wires and master wires.

Figure 1B:
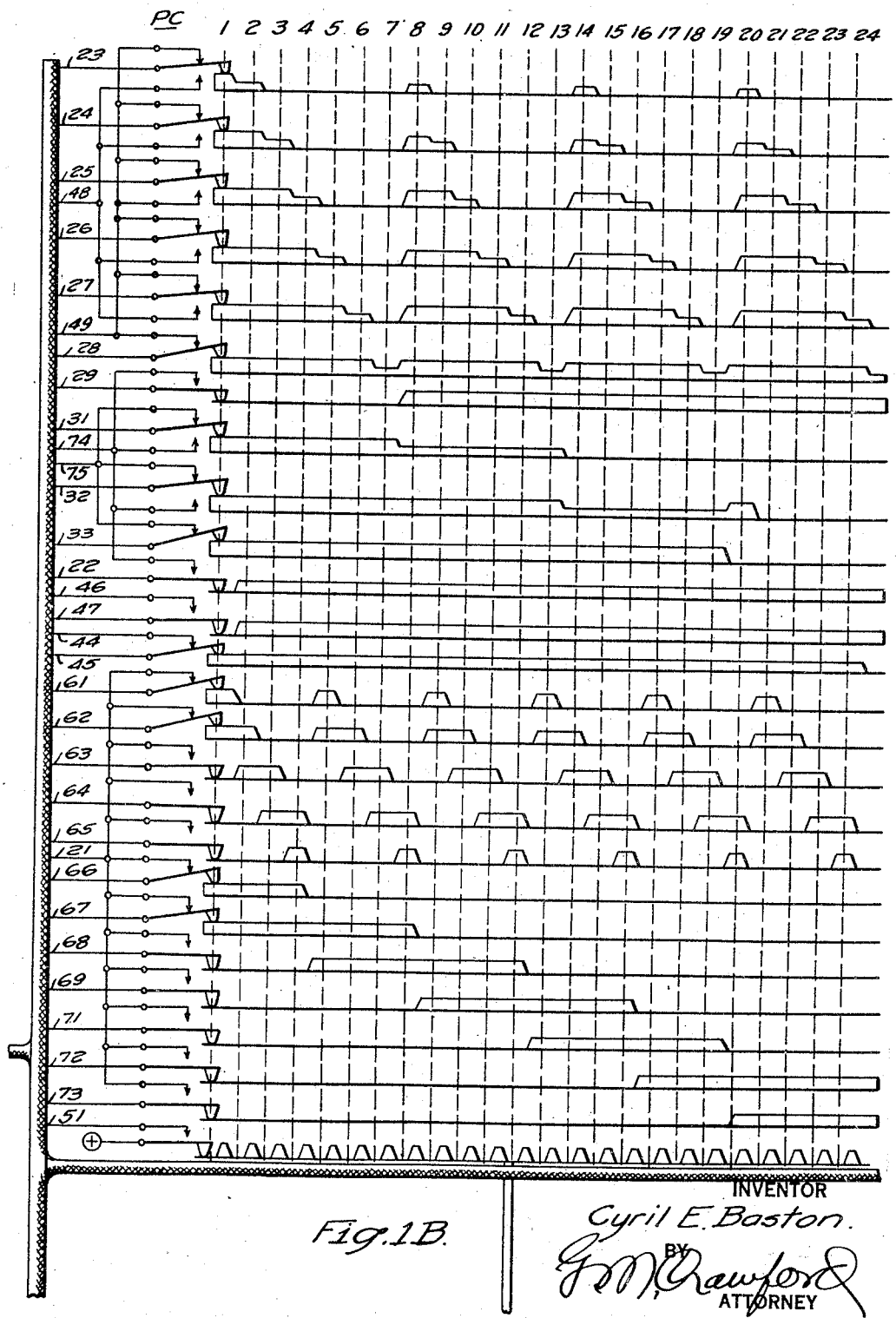

For a fuller understanding of the nature and objects of my invention, reference may be had to the following detailed description, taken in conjunction with the accompanying drawings, in which:

Figures 1A, 1B, 1C, and 1D, when combined by placing Fig. 1B to the right of Fig. 1A, Fig. 1C to the right of Fig. 1B and Fig. 1D at the bottom of Fig. 1B, constitute a diagrammatic view of a control system embodying my invention; and Fig. 2 is a chart showing the sequence of operation of certain of the control switches utilized in the system.

Referring to the drawings, the system shown therein comprises a pair of traction motors TM1 and TM2, a main transformer MT having a primary winding 10 and a secondary winding 11 for varying the motor voltage; and a plurality of main tap switches 1 to 7, inclusive, for changing taps on the secondary winding 11 of the main transformer.

In order to increase the number of steps obtainable for varying the motor voltage with a relatively small number of taps on the main transformer, an auxiliary buck-boost or notching transformer NT, having a primary winding 12 and a secondary winding 13, is utilized. The secondary winding 13 is connected in the motor circuit as shown and the primary winding 12 may be connected to different taps on the main transformer by means of a plurality of auxiliary tap switches A, B, C, D, and E.

A preventive coil PC1 is provided in the circuit for the primary winding 12 to permit certain of the auxiliary tap swtches to be closed at the same time without short-circuiting a portion of the main transformer. Likewise, a preventive coil PC2 is provided in the motor circuit to permit the simultaneous closing of certain of the main tap switches during the notching operations. A switch T is provided for completing the motor circuit when it is desired to apply power to the motors. The buck-boost system illustrated is of a type frequently used in alternating current railway control systems. However, it will be understood that other systems for controlling the motor voltage may be utilized if desired.

The control energy for operating the control apparatus may be supplied from a battery or other suitable source (not shown). In the drawings, the usual plus and minus signs are utilized to indicate connections to the positive and negative terminals of the control source.

In order to permit a large number of accelerating steps or notches to be provided, and at the same time reduce the number of train-line wires required, when multiple operation of locomotives is desired, a manually operated master controller MC is disposed for operation by the operator of the locomotive and a motor driven pilot controller PC is located remotely from the master controller MC. While only one pilot controller is illustrated, it will be understood from the following description that any desired number of pilot controllers may be utilized, all of which are controlled from the master controller MC. Thus, when a number of locomotives are operated in multiple, each locomotive is provided with a pilot controller of the type herein disclosed and all the pilot controllers may be controlled from a master controller located on the head locomotive, thereby assuring that the traction motors on all the locomotives are properly controlled.

Referring to Figure 1A, it will be seen that in the present instance, the master controller MC is divided into 4 sections and that each section is divided into 6 positions thereby providing 24 accelerating steps. Four master relays GG, HH, JJ, and KK, corresponding to the 4 sections of the master controller are provided. Likewise, 6 positioning relays AA, BB, CC, DD, EE, and FF corresponding to the 6 positions for each section of the controller are provided. An additional relay LL is also provided which controls the returning of the pilot controllers to position "1" when the master controller is fully returned to its normal or "off" position. One set of master and positioning relays of the type shown is required for each locomotive which is to be controlled from the master controller. These relays are located in the individual locomotives along with the pilot controllers, and are energized from the train-line wires which are in turn energized through the master controller. Thus, it will be seen that in the present system, only approximately half of the number of train-line wires is necessary as compared with previously known systems utilizing follow-up controllers which require a train-line wire for each position of the controllers.

As shown in Fig. 1B, the pilot controller PC may be of a cam type having 26 cam units. A portion of the cam followers or contact fingers have three positions, namely: a raised or upper position in which a circuit is established through the contacts, a mid or open position, and a lower position in which another circuit is established, to which they are actuated by the cam members. Others of the contact fingers have only an upper position and a mid position.

As shown in Fig. 1D, the pilot controller is driven by a pilot motor PM having two field windings, one of which is disposed to cause rotation of the pilot motor in an "on" direction and the other of which causes rotation in an "off" direction. A directional relay DR is provided for controlling the direction of rotation of the pilot motor PM. The relay DR is provided with two actuating coils, one of which actuates the contact members of the relay to a position to cause the pilot motor to rotate in the "on" direction and the other of which causes the pilot motor to rotate in the "off" direction. The relay DR is of such a construction that it remains in the position to which it was last actuated by the coil last energized until the other coil is energized to operate the relay to the opposite position. In this manner, a resistor R is connected in the circuit for the armature winding of the pilot motor to produce dynamic braking of the motor when the operating power is removed from the motor circuit.

A selector relay S and a pair of selector switches SS1 and SS2 are provided to cooperate with the controllers in controlling the operation of the directional relay DR and the pilot motor PM, as will be explained more fully hereinafter. The selector switch SS1 is energized when the master controller is operated to a position which requires the pilot controller to be moved in the "on" direction and the selector switch SS2 is energized when the pilot controller is to be moved in the "off" direction. The energization of the selector switches is controlled by the master wires and these master wires dominate the control of the pilot controller as long as they are energized, irrespective of the state of the positioning relays.

In view of the foregoing arrangement, a slip relay SR may be utilized to automatically reduce the voltage applied to the traction motors in the event of slipping of the wheels driven by the traction motors. The actuating coil of the slip relay SR is connected across the mid-point between two terminals of the armature windings of the motors and the mid-point of a reactor 14 which is connected across the other armature terminals of the motors. Thus, the actuating coil is energized in the event that one of the armature windings over-speeds, thereby causing an unbalance of the motor voltages. The contact members of the slip relay are so connected that they energize the actuating coil of the "off" selector switch SS2, thereby causing the pilot controller to be driven in the "off" direction to reduce the voltage applied to the traction motors until the slipping condition is stopped. In this manner, the loss of power, resulting from the engine man failing to notch back immediately when a slip occurs, is avoided.

In order that the function of the foregoing apparatus may be more clearly understood, the operation of the system will now be described in more detail.

Assuming that the main transformer is energized from a suitable source of alternating current power through a trolley conductor 15 and a pantograph current collector 16, power may be applied to the traction motors by actuating the master controller MC to position 1. When the master controller is on position 1, a conductor 21 is energized to close the motor switch T and the main tap changing switches 1 and 2 and the buck-boost switches A and B, thereby applying a predetermined voltage to the traction motors. The actuating coil of the switch T is connected directly to the conductor 21, thereby closing the switch T. The energizing circuit for the actuating coil of tap switch 1 extends from the conductor 21 through the 19th cam unit of the pilot controller PC, conductor 66, and the actuating coil of the switch 1 to negative. The energizing circuit for the actuating coil of the switch 2 extends from the conductor 21 through the 20th cam unit of the pilot controller, conductor 67, and the actuating coil of the switch 2 to negative.

Likewise, the energizing circuit for the switch A may be traced from the previously energized conductor 21 through the 14th cam unit of the pilot controller, conductor 61, and the coil of the switch A to negative. The energizing circuit for the switch B extends from a conductor 21 through the 15th cam unit, conductor 62, and the coil of the switch B to negative.

It will be noted that the sequence relay LL is also energized at this time, thereby closing the contacts of the relay LL to energize a conductor 22 which is connected to the 11th cam unit of the pilot controller. Since it has been assumed that the pilot controller is already on position 1, the energization of the conductor 22 has no effect at this time. However, if the pilot controller had not been returned to position 1 from a previous operation, the contact finger to which the conductor 22 is connected would be actuated to its raised position, thereby energizing a conductor 74 which, in turn, energizes the actuating coil of the "off" selector switch SS2. The closing of the switch SS2 energizes the "off" coil of the directional relay DR and the "off" field winding of the pilot motor PM through a circuit which extends from positive through the lower contacts of the switch SS2, the "off" coil of the directional relay DR, conductor 47, the 12th cam unit of the pilot controller, conductor 46, the "off" field winding, and the armature winding of the pilot motor to negative. In this manner the pilot motor is energized to return the pilot controller to position 1 before the tap-changing switches can be closed to apply power to the traction motors.

Assuming that it is desired to increase the voltage on the traction motors, the master controller may be actuated to any desired position, thereby causing the main tap-changing switches and the buck-boost switches to be closed in the order shown in the sequence chart in Fig. 2. Thus, if the master controller is actuated to position 2, the position relay AA and the master relay GG are energized, thereby closing the contact members of these relays. The closing of the relay GG energizes a conductor 41 to energize the actuating coil of the relay S, thereby closing the contact members of this relay. The closing of the relay AA energizes a conductor 23 which is connected to the first cam unit of the pilot controller, which unit is in the raised position while the controller is on position 1. Therefore, a conductor 49 is energized to energize the "on" coil of the relay DR and the "on" field winding of the pilot motor through a circuit which extends from the conductor 49 through the lower contacts of the relay S, the upper contacts of the selector switch SS2 which is deenergized at this time, the "on" coil of the relay DR, conductor 45, the 13th cam unit of the pilot controller, conductor 44, the "on" field winding and the armature winding of the pilot motor. In this manner, the relay DR is actuated to the "on" position and the "on" field of the pilot motor is energized causing the motor to drive the pilot controller toward the 24th position.

With the first few degrees of rotation of the pilot controller, the contact finger for the 26th cam unit is raised to energize a conductor 51 which is connected to the movable contact member of the directional relay DR which has been actuated to the "on" position, thereby maintaining energy on the conductor 45. Thus, as soon as the pilot controller starts to move, a circuit is established entirely separate of the master controller which keeps the pilot controller moving in the direction in which it starts, irrespective of what action the engine man may take, until it reaches the next notch. The 26th cam unit is known as a carry-over contact, its function being to insure that once a movement of the pilot controller is started, by whatever means, it is carried forward to completion and stops on the next notch.

At about mid-way between positions 1 and 2, the first cam unit on the pilot controller breaks contact, but the motion of the pilot controller is continued by the carryover contacts to the next notch. On notch 2, the relays supplying both the first and the 7th cam units are energized, but both units are open when the pilot controller is on position 2. Therefore, the controller stops on this position.

If the master controller is moved to notch 3, the positioning relay BB is energized, thereby closing the contact members of this relay. On position 2 of the controller, the second cam unit is closed. Therefore, the closing of the relay BB energizes a conductor 24 which, in turn energizes the conductor 49 to energize the directional relay and the pilot motor, causing the pilot controller to be driven to position 3.

A similar action takes place for the remaining notches of the master controller, in case the controller is notched up one point at a time, the proper positioning relay being energized to cause the pilot controller to be advanced notch by notch to a position corresponding to that of the master controller.

If the master controller is moved to, for example, the 12th notch in one operation, the relays EE and HH are energized, it being noted that the 12th notch is in the second section of the master controller. The closing of the relay HH energizes the conductor 41 to close the switch S, as previously described, and also energizes a conductor 31 which is connected to the 8th cam unit of the pilot controller. As shown, the 8th cam unit is closed during positions 1 to 7, inclusive of the pilot controller. Therefore, the conductor 75 is energized to close the "on" selector switch SS1. The closing of the switch SS1 energizes the "on" coil of the relay DR and the "on" field winding of the pilot motor, causing the pilot controller to be driven toward position 12, as explained hereinbefore.

It will be seen that the 8th cam unit breaks contact between positions 7 and 8, thereby deenergizing the switch SS1. However, the carryover contacts will function to continue the movement of the pilot controller to position 8, as explained hereinbefore. On position 8, the 5th cam unit is closed, thereby connecting a conductor 27, which is energized by the closing of the relay EE, to the conductor 49 which applies energy to the directional relay, and the pilot motor through the contact members of the switch S, as explained hereinbefore. Accordingly, the pilot controller is actuated to position 12 where it is stopped by the interruption of the 5th cam unit to which the conductor 27 is connected.

In this manner, it will be seen that the master relays function to control the movement of the pilot controller to the proper section and the positioning relays function to control this movement to the proper position in any particular section. Thus, the relays GG, HH, JJ, and KK select the zone or section and the relays AA, BB, CC, DD, EE and FF select the position within the zone to which the pilot controller is to be operated.

As explained hereinbefore, the relay LL returns the pilot controller to position 1 at all times when the master controller is moved to the "off" position. The action in moving the pilot controller from a given notch to a lower notch is the same as going from a lower notch to a higher notch except the opposite portion is utilized, and it is believed to be unnecessary to describe such an operation in detail.

As previously explained, the slip relay SR, when energized by an unbalanced condition of the motor voltage as a result of the slipping of the wheels driven by one of the motors, functions to operate the "off" selector switch SS2 which, in turn, causes the pilot controller to be driven in a direction to reduce the voltage applied to the motors. In this manner, the relay SR functions to automatically stop the slipping condition. After the slipping has stopped, the pilot controller is automatically restored to the position corresponding to the position of the master controller, in the manner hereinbefore explained.

Furthermore, it will be understood that relays of other types, such as over-voltage, over-current or watt-meter type relays may be utilized in place of the slip relay herein illustrated to protect the driving motors against abnormal conditions by operating the pilot motor to reduce the motor voltage in the manner described.

In order to simplify the drawings, all of the cam units for controlling the main tap switches 1 to 7 and the auxiliary tap switches A to E have been shown on one shaft of the pilot controller. If desired, the pilot controller may be provided with different shafts which are properly geared to the pilot motor to provide either a continuous or intermittent operation of the shafts, as desired. Thus, one shaft may be provided which is driven continuously for controlling the operation of the auxiliary tap switches and another shaft may be provided which is driven intermittently for controlling the operation of the main tap switches which are operated only at certain intervals, as indicated in the sequence chart shown in Fig. 2.

From the foregoing description, it is apparent that I have provided a control system for controlling the operation of electric locomotives, or other electrical apparatus, which greatly simplifies and reduces the wiring required between the main control station and the stations located remotely from the main station, thereby making the present system particularly suitable for use with electric locomotives which operate in multiple and are controlled from the head locomotive. Furthermore, the present system provides additional protective features, such as the automatic stopping of wheel slippage and re-application of power, not found in previously known systems.

Since many modifications may be made in the apparatus and arrangement of parts without departing from the spirit of my invention, I do not wish to be limited other than by the scope of the appended claims.

I claim as my invention:

1. In a control system, in combination, a secondary controller, a master controller operable to a plurality of positions, a pilot motor for driving said secondary controller to a position corresponding to the position of the master controller, a plurality of wires interconnecting said controllers, the number of said wires being less than the number of positions of said controllers, a directional relay having a pair of actuating coils, and a selector relay for controlling the energization of the directional relay coils, said relays cooperating with said controllers to control the operation of the pilot motor.

2. In a control system, in combination, a secondary controller, a master controller operable to a plurality of positions, a pilot motor for driving said secondary controller to a position corresponding to the position of the master controller, a plurality of wires interconnecting said controllers, the number of said wires being less than the number of positions of said controllers, a directional relay for controlling the direction of rotation of the pilot motor, and a pair of selector relays for controlling the operation of the directional relay.

3. In a control system, in combination, a secondary controller, a master controller operable to a plurality of positions, a pilot motor for driving said secondary controller to a position corresponding to the position of the master controller, a plurality of wires interconnecting said controllers, the number of said wires being less than the number of positions of said controllers, a directional relay for controlling the direction of rotation of the pilot motor, a pair of selector relays for controlling the operation of the directional relay, and a slip relay cooperating with one of said selector relays to operate the pilot motor under predetermined conditions.

4. In a control system, in combination, a secondary controller, a master controller operable to a plurality of positions, a pilot motor for driving said secondary controller to a position corresponding to the position of the master controller, a plurality of wires interconnecting said controllers, the number of said wires being less than the number of positions of said controllers, a directional relay for controlling the direction of rotation of the pilot motor, a pair of selector relays for controlling the operation of the directional relay, and a slip relay cooperating with one of said selector relays to operate the pilot motor in a predetermined direction, said slip relay being responsive to an abnormal condition in the control system.

5. In a control system, in combination, a secondary controller, a master controller operable to a plurality of positions, a pilot motor for driving said secondary controller to a position corresponding to the position of the master controller, a plurality of wires interconnecting said controllers, the number of said wires being less than the number of positions of said controllers, selector relays for controlling the operation of the pilot motor, and a relay responsive to an abnormal condition in the control system for cooperating with said selector relays to operate the pilot motor in a direction to remove said abnormal condition.

CYRIL E. BASTON